United States Patent [19]

Henle et al.

[11] 3,798,606

[45] Mar. 19, 1974

[54] BIT PARTITIONED MONOLITHIC CIRCUIT COMPUTER SYSTEM

[75] Inventors: Robert A. Henle, Port Chester; Gerald A. Maley, Fishkill, both of N.Y.; Wilbur D. Pricer, Burlington, Vt.

[73] Assignee: International Business Machines Corporation, Armonk, N.Y.

[22] Filed: Dec. 17, 1971

[21] Appl. No.: 209,056

[52] U.S. Cl. .......... 340/172.5
[51] Int. Cl. .......... G06f 11/00, G06f 13/00
[58] Field of Search .......... 340/172.5; 307/213, 238, 307/303

[56] References Cited

UNITED STATES PATENTS

| | | | |
|---|---|---|---|
| 3,462,742 | 8/1969 | Miiller et al. | 340/172.5 |
| 3,597,641 | 8/1971 | Ayres | 307/303 |
| 3,641,511 | 2/1972 | Cricchi et al. | 307/238 X |
| 3,579,201 | 5/1971 | Langley | 340/172.5 |
| 3,582,902 | 6/1971 | Hirtle | 340/172.5 |
| 3,609,712 | 9/1971 | Dennard | 307/238 X |
| 3,643,232 | 2/1972 | Kilby | 307/238 X |
| 3,651,472 | 3/1972 | Holtey | 340/172.5 |
| 3,668,650 | 6/1972 | Fuh-Lin Wang | 340/172.5 |
| 3,702,988 | 11/1972 | Haney et al | 340/172.5 |

OTHER PUBLICATIONS

Henle, R. A. et al., "Error Correcting Address Technique" in IBM Technical Disclosure Bulletin, Vol. 12, No. 12, May, 1970; pp. 2,071-2,072.

*Primary Examiner*—Paul J. Henon
*Assistant Examiner*—Melvin B. Chapnick
*Attorney, Agent, or Firm*—Kenneth R. Stevens

[57] ABSTRACT

A monolithic circuit bit partitioned computer system for processing M bits of data comprising a substrate for providing electrical interconnection paths to a plurality of M monolithic circuit modules. Each of the M modules includes distinct decoder means, memory means, elemental quasi-arithmetic means and control circuitry, and each of the M modules are uniquely associated with the distinct ones of the M bits of data for collectively and universally processing the M bits of data.

9 Claims, 4 Drawing Figures

INVENTORS
ROBERT A. HENLE
GERALD A. MALEY
WILBUR D. PRICER
BY Kenneth R. Stevens
ATTORNEY

BIT PARTITIONED MONOLITHIC CIRCUIT COMPUTER SYSTEM

BACKGROUND OF THE INVENTION

This invention relates to a computer system and more particularly to a system which is completely implementable with monolithic integrated circuit technology on a substrate.

Historically, a complete data processing system evolves around the central processing unit, CPU. The CPU basically comprises an arithmetic unit and complex control circuitry. This portion of the computer hardware constitutes complex and costly aspects of the system. Due to this fact, efforts to fully and most efficiently exploit large-scale integration for an overall computer system are hindered.

As applied to solid state memory applications, U.S. Pat. No. 3,436,734, Pomerene et al, assigned to the same assignee as the present invention, describes a technique to use a large number of integrated circuits on a silicon chip in an efficient and reliable manner. Therein is described a data processing storage or memory arrangement which utilizes a plurality of basic operational memory (BOM) units. Each of the BOM units in the storage or memory system is identified with one and only one bit position of the processing system data word. That is, the high order bits of all words are stored in one BOM, the next highest order bits in the next BOM, etc. This arrangement makes possible a processing system wherein continued operation of the system is possible by correcting erroneous data produced by a defective portion of a storage system, and which permits continued operation while the defective portion of the storage system is removed and repaired or replaced. Further, this configuration provides a data processing system which has a storage system which allows replacement or repair of a defective portion of the storage system and which provides, for each access to the storage system, a plurality of computer words for processing by the system.

However, it has previously been impractical to fully implement this concept to other portions of a computer system due to the complexity of the CPU. As a corrollary of this problem, the use of error detecting and correcting schemes have been limited.

SUMMARY OF THE INVENTION

Therefore, it is an object of the present invention to provide a computer system which can be feasibly and entirely implemented according to bit slice partitioning techniques.

Another object of the present invention is to provide a computer system implemented in monolithic form wherein the central processing unit time delays are compatible with the high-speed operation of existing and available monolithic memory accessing speeds.

Another object of the present invention is to provide an integrally packaged CPU without a corresponding substantial degradation in system performance.

A further object of the present invention is to provide a monolithic computer system comprising a large-scale integrated memory combined with an integrally packaged central processor so as to avoid traditional processor-memory cable delays.

Another feature of the present invention is to provide a large-scale integrated memory combined with an integrally packaged processor combined with error-correction circuitry wherein faulty circuits in the error-correction circuitry still provide absolute validity of the system output data.

A further object of the present invention is to provide an integrated circuit computer system in which known error-correction techniques can be extended to virtually, the entire main frame.

Another object of the present invention is to provide an integrally packaged processor-memory or a programmed logic computer (PLC) which greatly simplifies hardware implementation, reduces part number inventory and allows logical alterations by means of programming techniques.

Another object of the present invention is to provide a PLC which is readily adaptable to error-correction techniques, namely, Hamming code and triple modular redundance (TMR) approaches, so as to provide positive and absolute fault location identification and error correction.

The foregoing and other objects, features and advantages of the invention will be apparent from the following more particular description of the preferred embodiments of the invention as illustrated in the accompanying drawings.

The present invention provides a monolithic circuit computer system comprising a large-scale integrated circuit memory and integrally packaged elemental central processing unit comprising a plurality of M modules each including decoder means, memory means, elemental quasi-arithmetic means and control circuitry uniquely associated with distinct M bits of data for collectively and universally processing the M bits of data. Error-detection and correction circuitry associated with each of the M modules permits circuit failures to occur in the error-correction circuitry without affecting the validity of the output data.

DESCRIPTION OF THE PREFERRED EMBODIMENTS

Figure 1:
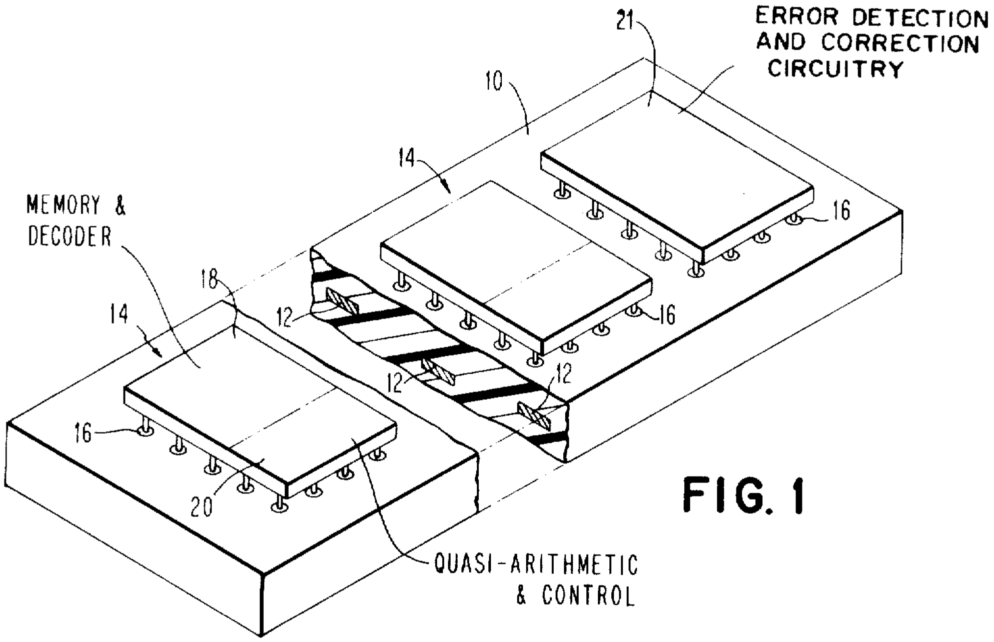
FIG. 1 is a schematic perspective view, partially broken away, illustrating bit partitioning of an entire computer system and showing the organization of a large-scale integrated circuit memory combined with an integrally packaged processor.

Now referring to FIG. 1, a monolithic circuit partitioned computer system is shown comprising an electrical interconnection substrate 10 having a plurality of electrical conductors schematically illustrated at 12. A plurality of modules 14 are mounted on the upper surface of the substrate 10 and electrically connected to the conductive paths 12 via a plurality of upper surface metallurgical connections depicted at 16. Each of the modules 14 comprises a memory and decoder section 18 and a quasi-arithmetic and control circuitry section 20.

The electrical interconnection substrate 10 is illustrated as comprising a plurality of multi-level wiring interconnections 12, which in itself do not form part of the present invention, and need not necessarily be restricted to multi-level wiring interconnection packages, but can be implemented with single-level interconnection packages. One suitable multi-level interconnection package is described in U.S. Application Ser. No. 175,536, filed on Aug. 27, 1971, assigned to the same assignee as the present invention and now abandoned.

The multi-level wiring conductors 12 generally provide voltage distribution planes, ground planes, etc., for each of the modules, and also provide specific electrical input/output connections to each of the individual modules 14.

The error-correction circuitry is depicted as being monolithically implemented in a separate module 21. However, if desired, the error-correction circuitry can be located and integrally formed as part of each of the modules 14.

In order to monolithically implement the entire computer system according to the bit partitioning principle, it is necessary to provide an elemental CPU which is uniquely associated with a portion of its monolithic memory. Normally, the CPU's are extremely complex due to their sophisticated arithmetic capability and required attendant control circuitry. The present invention, in contradistinction, employs an elemental or a very basic quasi-arithmetic unit and associated control circuitry which in the preferred embodiment is capable of providing the following functions:

- COPY —an instruction for moving an addressable bit in a memory location into the quasi-arithmetic unit.
- STORE —an instruction for moving the contents of the quasi-arithmetic unit to any addressable location in memory.
- OR —an instruction for OR'ing any addressable bit in memory location with the contents of the information stored in the quasi-arithmetic unit.
- AND —an instruction for AND'ing any addressable bit in memory location with the contents stored in the quasi-arithmetic unit.
- INVERT —an instruction for moving the contents of any addressable bit of data from a memory storage location, and placing it in complementary form in the quasi-elemental arithmetic unit.

Figure 2:
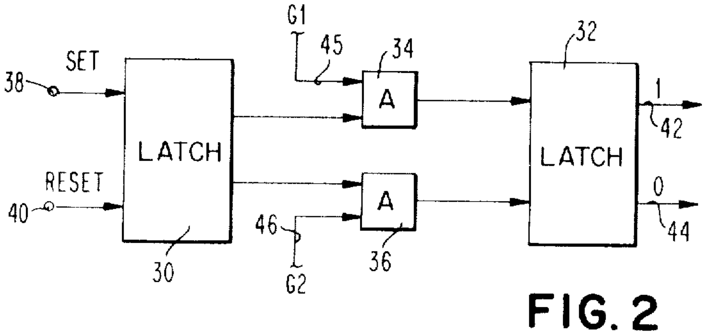
FIGS. 2 and 3 are electrical schematic representations of the elemental quasi-arithmetic means and control circuitry.
Figure 3:
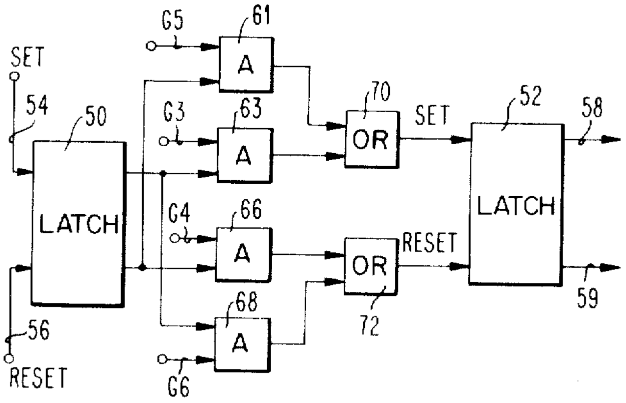
Figure 4:
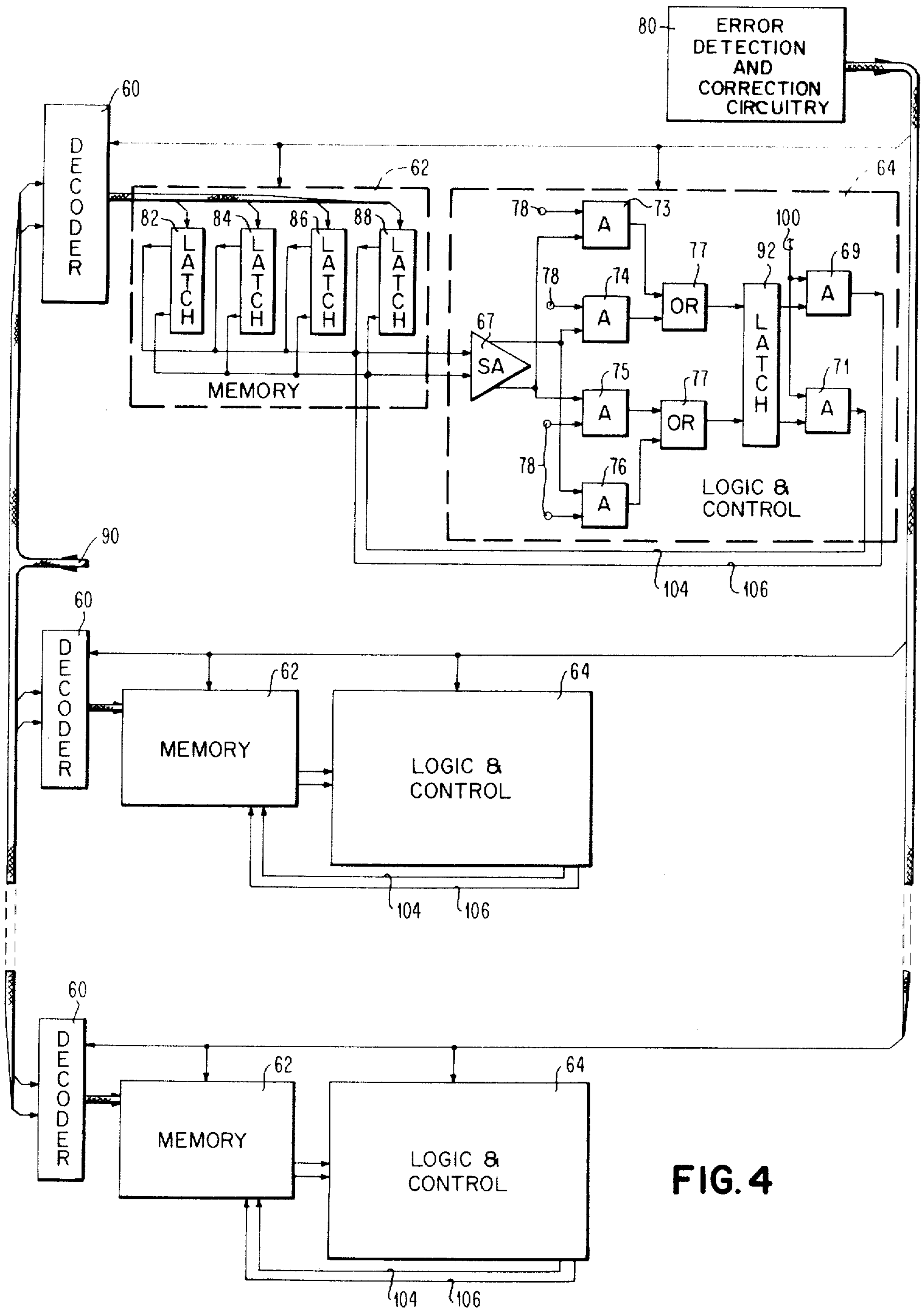
FIG. 4 is a schematic representation illustrating the electrical circuitry of the present invention which can be fully implemented into the bit partitioned large-scale integrated circuit memory and integrally packaged processing unit comprising duplicative elemental units depicted in FIG. 1.

A quasi-arithmetic unit and control circuitry capable of performing all of these functions is schematically illustrated in FIG. 4. FIGS. 2 and 3 illustrate one manner of adding or building up logic elements in order to arrive at a quasi-arithmetic unit capable of performing the five enumerated functions. The use of a quasi-arithmetic unit capable of performing these functions gives an excellent trade-off between the necessary hardware sophistication required for the quasi-arithmetic unit and the additional memory locations necessary for operating the quasi-arithmetic unit so as to enable it to perform complex arithmetic functions. Theoretically, only the "OR" and "AND" capability is all that is necessary to generate any function assuming the availability of complements and a large storage area. Thus, within the spirit of the present invention, the functional capabilities of the quasi-arithmetic unit can be theoretically decreased down to the minimum functions, that is, only the OR and the AND functions, or increased above that described in the preferred embodiment with an attendant trade-off advantage in memory size reduction in order to perform any arithmetic function within the overall computer system design.

FIG. 2 illustrates logic circuitry for performing the OR and AND function of the quasi-arithmetic unit. The logic circuit comprises a pair of latch circuits 30 and 32 interconnected by way of a pair of AND gates 34 and 36. The circuit is adapted to receive SET input signals on line 38 and RESET signals on line 40. True and complementary signals, designated by 1 and 0 are generated on the output lines 42 and 44, respectively, from the output latch circuit 32. Basically, the logic configuration describes a double rail latch-to-latch transfer scheme. In conventional manner, when both gating signals, represented by G1 and G2 on lines 45 and 46 are simultaneously applied to the AND gates 34 and 36, data is transferred from latch 30 to latch 32. However, in the embodiment of the present invention, only the signal G1 is applied to line 45 in order to perform an OR function. In this instance, the latch 32 will end up storing a 1, if either latch 30 or latch 32, or both latches 30 and 32 initially contain a binary 1 at the start of the operation. This logic manipulation amounts to the contents of latch 30 being OR'd with the contents of latch 32.

Similarly, the circuit of FIG. 2 can be operated to perform an AND function. If the gating signal G2 on line 46 is raised to an up level without energizing the G1 signal, then the AND function is obtained. That is, latch 32 will contain a binary 1 only if latch 30 and 32 both contained a binary 1 before the gating signal G2 was raised to an up or 1 level. Accordingly, depending upon the energization of the G1 or G2 lines, data moving between latches may be OR'd or AND'd to the receiving latch 32.

FIG. 3 illustrates a minor modification to the logic circuitry of FIG. 2 in order to provide a logic circuit which performs not only the OR and AND function, but also the INVERT function. The logic circuit comprises an input latch 50 and an output latch 52 adaptive to receive SET and RESET signals on lines 54 and 56, respectively, and is capable of generating true and complement output signals on output lines 58 and 59. Interconnected between the latch circuits 50 and 52 are a plurality of AND circuits 61, 63, 66 and 68, and also a pair of OR circuits 70 and 72. The AND circuits 61, 63, 66 and 68 are each individually adaptive to receive separate gating signals designated by G5, G3, G4 and G6, respectively. The AND gates 61 and 68 effectively cross the connection running between the latch circuits 50 and 52.

Thus, by simultaneously raising the gating signals G5 and G6 to an up position, the inverse of the data stored in latch 50 is gated into latch 52. Two additional logic connectives are gained by independently raising the G5 and G6 lines. In the first instance, the inverse in the contents of latch 50 is OR'd with the contents of latch 52. Similarly, by raising only gating signal G6, the inverse of the contents of latch 50 is AND'd with the contents of latch 52.

Now referring to FIG. 4, it illustrates the manner in which the receiving latch of FIGS. 2 and 3 are replaced by an addressable array of memory cells. The array can be a core memory, a monolithic memory or even a drum track. As seen schematically in FIG. 4, the overall bit partition computer system comprises a plurality of separate memory modules, schematically illustrated in FIG. 1 as modules 14. Each module comprises a memory and decoder section depicted at 62 and 60 (section 18, FIG. 1). The quasi-arithmetic unit comprises a logic and control section 64 and corresponds to the monolithic implementation portion depicted at 20 in FIG. 1. The quasi-arithmetic or logic and control section 64 essentially corresponds to the previous logic circuit shown in FIG. 3 except that for implementation in the overall computer system, a sense amplifier 67 and an output gating system comprising AND gates 69 and 71 are added. A plurality of AND gates 73, 74, 75 and 76 and the pair of OR gates 77 function in an identical manner to that also previously described with reference to FIG. 3. Similarly, the plurality of gating terminals 78 to the AND gates are adaptive to receive gating signals in order to provide the desired logic functions, again as described in connection with FIG. 3. Error-detection and correction means is schematically depicted at 80 and operatively connects to each of the elements, that is, the decoders 60, the memory circuit 62, and the quasi-arithmetic or logic and control units 64 for each of the separate bit partitioned modules. In the preferred embodiment, the error-correction circuitry is disclosed as being formed on a separate module as schematically depicted in FIG. 1 as module 21. However, it is to be understood that it is possible to incorporate separate error-correction circuitry on each of the modules rather than having a separate main error-correction module connected in parallel to each of the separate main frame bit partitioned modules 14.

OPERATION

In the electrical schematic representation of FIG. 2, each of the bit partition modules is organized as comprising a single bit per module. For purposes of illustration, each of the memory units 62 within a particular module comprises only four memory locations represented by the four latches 82, 84, 86 and 88. In response to a decode signal on input line 90 to a decoder 60, the following instructions are performed in order to communicate with a latch circuit 92 in the logic and control or quasi-arithmetic section 64.

COPY instruction — energize AND gates 74 and 75. This instruction moves any address bits in memory location 62 to latch circuit 92.

STORE instruction — energize AND gates 69 and 71 via gating line 100. This instruction moves the contents of the information stored in latch 92 to any addressable memory location via lines 104 and 106.

OR instruction — energize AND gate 74. Any addressable bit in memory 62 is OR'd with the contents stored in latch 92.

AND instruction — energize AND gate 75. A bit of information addressed in memory by means of decoder 60 is AND'd with the contents stored in latch 92.

INVERT instruction — simultanously energize AND gates 73 and 76. The 1's complement of data addressed from memory location 62 is stored in latch 92.

The ability to bit partition the entire main frame of the computer system in combination with known error-detection and correction techniques permits fault-free computer operation despite circuit failures. That is, no single or plurality of circuit failures, within certain limitations, will cause the computer system to fail.

The decoder 60, the memory 62, and the logic and control or quasi-arithmetic section 64 is arranged in a configuration adaptable to Hamming error-detection and correction techniques. In addition, the Hamming error-detection and correction techniques are combined with well-known triple modular redundant (TMR) error correction schemes in order to provide a fault-free computer.

The capabilities of the Hamming error-detection and correction codes are well known, and essentially constitute a system which combines the computer system binary word with Hamming check bit locations. The maximum capability of the system is double error-detection and single error-correction. Similarly, the triple modular redundant (TMR) scheme is a well-known technique and essentially comprises the use of three functionally identical units operating in parallel to form a single function. The output of each of the three functional units are then compared, and a two out of three vote is determinative of the error-free data. For example, in organizing a memory according to Hamming and TMR error-correction principles, the output of the memory is adapted with a Hamming decoder which accepts the Hamming word from memory. A Hamming decoder checks the data bits and provides a triple modular redundant output signal. These three output signals then drive a triple modular redundant logic unit. A Hamming encoder connected to each of the three triple modular redundant logic units functions to accept the data bits and add the Hamming parity bits. The output of the three Hamming encoders then drives a voltage circuit which then operates the bit drivers for the memory. Since the bit driver follows the Hamming encoders, any circuit can fail without affecting the operation of the computer. Again, many error-correction schemes are available to provide absolute fault-free computer operation once the entire computer or main frame is bit partitioned according to the present invention. Further details and teachings on the use of Hamming and triple modular redundant error-correction schemes are found in U.S. Pat. No. 3,436,734, Pomerene et al, issued Apr. 1, 1969, and assigned to the same assignee as the present invention, and also in IBM Technical Disclosure Bulletin Vol. 12, No. 12, May 1970, pages 2,071 and 2,072, entitled "Error-Correcting Address Technique" and IBM Technical Disclosure Bulletin Vol. 14, No. 5, October 1971, page 1,632, entitled "Mixing Hamming Code with TMR."

As illustrated in FIG. 1, the computer system can be suitably fabricated to include as many parallel connected modules as desired. Thus, an 8-bit data word requires eight modules 14, in addition to the error-correction module 21, when it is not separated and formed as any integral part of each of the modules 14.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A monolithic computer system for processing M bits of data, said system comprising:

a. a substrate including a plurality of conductive paths for providing electrical interconnection and a source of power, b. M separate monolithic circuit modules connected to said plurality of conductive paths, each of said M modules constituting interconnected operative duplicate elemental units, each elemental unit including decoder means having input and output terminals, memory means having input and output terminals, quasi-arithmetic means having input and output terminals, and control circuitry interconnected thereto, c. each decoder means associated with one of said M monolithic circuit modules connected at its input terminal to receive only a single one of said M bits of data, and connected at its output terminal to said memory means input terminal, d. each memory means output terminal being connected to its quasi-arithmetic means input terminal, e. a first connection means connecting said quasi-arithmetic means output terminal to said memory means, and each module being responsive for logically combining data stored in its memory means with said data stored in its quasi-arithmetic means for processing successive sets of M bits of data, and f. error correction circuitry means connected to each of said M monolithic circuit modules for providing error detection and correction.

2. A monolithic computer system for processing M bits of data as in claim 1 wherein:

a. each of said quasi-arithmetic means comprises logic circuitry having input terminal means connected to said memory means, and output circuit means also connected to said memory means, and b. each of said decoder means is responsive to input decoder signals for transferring information between said memory means and said logic circuitry.

3. A monolithic computer system for processing M bits of data as in claim 2 wherein:

a. each of said quasi-arithmetic means is independently responsive to input decoder signals at said decoder means for independently processing distinct positions of said M bits of data.

4. A monolithic computer system for processing M bits of data as in claim 3 wherein:

a. said logic circuitry within said quasi-arithmetic means further includes a plurality of gating terminals adapted to receive gating signals, and b. said logic circuitry being responsive to selected gating signals on said gating terminals for providing elemental logic functions such as AND, OR and INVERT.

5. A monolithic computer system for processing M bits of data as in claim 1 wherein:

a. said error-correction circuitry means comprises Hamming code and triple modular redundancy error-correction circuitry for providing absolute error-free operation of said computer system.

6. A monolithic computer system for processing M bits of data as in claim 1 wherein:

a. said plurality of M monolithic modules are located and interconnected on a single electrical interconnection substrate.

7. A monolithic computer system for processing M bits of data as in claim 6 wherein:

a. each of said decoder means are responsive to input decoder signals for transferring information between said memory circuit and said quasi-arithmetic means in a plurality of successive cycles in order to perform arithmetic functions.

8. A monolithic computer system for processing M bits of data as in claim 1 wherein:

a. said decoder means, said memory means, and said quasi-arithmetic means comprise fully integratable units.

9. A monolithic computer system for processing M bits of data as in claim 8 wherein:

a. said decoder means, said memory means, and said quasi-arithmetic means are located on a single nonconductive substrate.

* * * * *